US006998192B1

(12) United States Patent
Yumoto et al.

(10) Patent No.: US 6,998,192 B1
(45) Date of Patent: Feb. 14, 2006

(54) NEGATIVE ELECTRODE FOR A NONAQUEOUS BATTERY

(75) Inventors: Hiroyuki Yumoto, Stevenson Ranch, CA (US); Joanna Dodd, Burbank, CA (US); Mikito Nagata, Valencia, CA (US); Phuong-Nghi Lam, Burbank, CA (US)

(73) Assignee: Quallion LLC, Sylmar, CA (US)

( * ) Notice: Subject to any disclaimer, the term of this patent is extended or adjusted under 35 U.S.C. 154(b) by 44 days.

(21) Appl. No.: 10/652,118

(22) Filed: Aug. 28, 2003

Related U.S. Application Data

(60) Provisional application No. 60/406,846, filed on Aug. 29, 2002.

(51) Int. Cl.
*H01M 4/48* (2006.01)

(52) U.S. Cl. .............................. 429/231.4; 429/231.8; 429/232; 429/212; 429/231.1; 429/245; 252/182.1

(58) Field of Classification Search ............ 429/231.4, 429/231.8, 232, 212, 231.1, 245; 252/182.1
See application file for complete search history.

(56) References Cited

U.S. PATENT DOCUMENTS 5,028,500 A 7/1991 Fong et al.
5,153,082 A 10/1992 Ogino et al.
5,244,757 A 9/1993 Takami et al.
5,312,611 A 5/1994 Takami et al.
RE34,991 E 7/1995 Yoshino et al.
5,547,654 A * 8/1996 Machida et al. ........ 423/445 R
5,612,155 A 3/1997 Takami et al.
5,631,100 A 5/1997 Yoshino et al.
5,744,264 A 4/1998 Barker
5,888,670 A 3/1999 Kawakami
5,900,336 A 5/1999 Kabata et al.
6,019,802 A 2/2000 Ishizuka et al.
6,022,518 A 2/2000 Yamazaki et al.
6,037,095 A 3/2000 Miyasaka
6,040,087 A 3/2000 Kawakami
6,087,044 A 7/2000 Iwase et al.
6,245,464 B1 6/2001 Spillman et al.
6,261,722 B1 7/2001 Dasgupta et al.
6,287,729 B1 9/2001 Tamaki et al.
6,294,291 B1 9/2001 Ozaki et al.
6,300,012 B1 10/2001 Iijima et al.
6,309,777 B1 10/2001 Ohta et al.
6,337,156 B1 1/2002 Narang et al.

(Continued)

FOREIGN PATENT DOCUMENTS

EP 0 474 183 B1 12/2000

(Continued)

OTHER PUBLICATIONS

Hitachi Chemical Website-Anode Material for Lithium Ion Batteries section.*

(Continued)

*Primary Examiner*—Laura Weiner
(74) *Attorney, Agent, or Firm*—Gavrilovich, Dodd & Lindsey LLP

(57) ABSTRACT

A negative electrode for use in secondary battery with nonaqueous electrolyte having a high voltage and energy density and a superior cycle property, characterized in that the active material comprises composite carbon materials containing massive ball-shaped graphite particles, carbon fibers, and graphite flakes. The massive ball-shaped graphite particles provide porosity to the composite, the carbon fibers improve packing density, conductivity, and stiffness to prevent the body made thereof from swelling and decomposing, and the graphite flakes reduce friction in the mixture. An aqueous, non-fluorine-containing binder is used, along with a titanium negative substrate.

38 Claims, 3 Drawing Sheets

U.S. PATENT DOCUMENTS

| | | | |
|---|---|---|---|
| 6,342,319 B1 | 1/2002 | Kuboki et al. | |
| 6,350,544 B1 | 2/2002 | Takami et al. | |
| 6,350,546 B1 | 2/2002 | Gan et al. | |
| 6,355,377 B1 | 3/2002 | Sheem et al. | |
| 6,383,686 B1 | 5/2002 | Umeno et al. | |
| 6,395,427 B1 | 5/2002 | Sheem et al. | |
| 6,403,259 B1 | 6/2002 | Kitagawa et al. | |
| 6,420,070 B1 | 7/2002 | Kasamatsu et al. | |
| 6,455,199 B1 | 9/2002 | Kitagawa et al. | |
| 6,479,426 B1 | 11/2002 | Ryu et al. | |
| 6,617,075 B1 | 9/2003 | Mao et al. | |
| 2002/0029464 A1 | 3/2002 | Iijima et al. | |
| 2002/0034685 A1 | 3/2002 | Sato et al. | |
| 2002/0037455 A1 | 3/2002 | Tani et al. | |
| 2002/0039684 A1 | 4/2002 | Matsubara et al. | |
| 2002/0061440 A1 | 5/2002 | Suzuki et al. | |
| 2002/0064712 A1 | 5/2002 | Sekino et al. | |
| 2003/0068555 A1 | 4/2003 | Naruoka | |
| 2003/0113632 A1 | 6/2003 | Brown et al. | |
| 2003/0152835 A1 | 8/2003 | Desgupta et al. | |
| 2004/0043293 A1 * | 3/2004 | Nagata et al. ........... | 429/231.8 |

FOREIGN PATENT DOCUMENTS

| | | |
|---|---|---|
| EP | 474183 B1 | 12/2000 |
| EP | 1 089 366 A1 | 4/2001 |
| EP | 0 803 926 B1 | 12/2001 |
| EP | 0 903 799 B1 | 3/2003 |
| JP | 04-115457 | 4/1992 |
| JP | 04-237971 | 8/1992 |
| JP | 04-342966 | 11/1992 |
| JP | 05-074462 A2 | 3/1993 |
| JP | 05-283060 A2 | 10/1993 |
| JP | 06-044959 A2 | 2/1994 |
| JP | 06-111818 | 4/1994 |
| JP | 06-163032 | 6/1994 |
| JP | 08-031419 A2 | 2/1996 |
| JP | 08-083608 | 3/1996 |
| JP | 08-306390 A2 | 11/1996 |
| JP | 2762881 B | 3/1998 |
| JP | 10-188959 A2 | 7/1998 |
| JP | 10-302794 A2 | 11/1998 |
| JP | 11-054123 A2 | 2/1999 |
| JP | 2000-228193 A2 | 8/2000 |
| JP | 2000-251890 A2 | 9/2000 |
| JP | 2000-260424 A2 | 9/2000 |
| JP | 2000-294230 A2 | 10/2000 |
| JP | 2000-323174 A2 | 11/2000 |
| JP | 2002008655 A2 | 1/2002 |
| WO | WO 90/13924 | 11/1990 |
| WO | WO 96/40923 A1 | 9/1998 |
| WO | WO 02/41417 A1 | 5/2002 |

OTHER PUBLICATIONS

Mesocarbon Microbeads Removes® M Series , MCMB, http://www.ashland-suedchemie.de/en/english/c__produkte/cprodukteMesocarbon Microbeads Removes® M Series, MCMB, http://www.ashland-suedchemie.de/en/english/c__produkte/cprodukte5.htm.

* cited by examiner

NEGATIVE ELECTRODE FOR A NONAQUEOUS BATTERY

REFERENCE TO PRIOR FILED APPLICATIONS

This application is related to U.S. patent application Ser. No. 10/264,870 filed on Oct. 3, 2002 and entitled "Negative Electrode for a Nonaqueous Battery," which claims priority to U.S. Provisional Patent Application Ser. No. 60/406,846, filed on Aug. 29, 2002 and entitled "Negative Electrode for a Nonaqueous Battery," each of the which is assigned to the assignee of the current application and is hereby incorporated by reference herein in its entirety.

GOVERNMENT LICENSE RIGHTS

None

FIELD

This invention relates to a negative electrode for a nonaqueous battery and more particularly to a negative electrode having carbonaceous active material.

BACKGROUND

Aerospace devices and implantable medical devices such as pacemakers, defibrillators, speech processors, left ventricular assist devices (LVAD), and neurostimulators have many stringent requirements. They must be small and lightweight, and must therefore have high energy density batteries to provide adequate capacity with long cycle life and long calendar life. For aerospace applications, good low temperature performance is also needed, and for implantable medical devices, good body temperature performance is also needed.

SUMMARY

A negative electrode is disclosed, comprising: a substrate; and a coating on the substrate comprising: a carbonaceous material comprising a mixture of massive ball-shaped graphite particles, carbon fibers, and graphite flakes; and a binder. The substrate may comprise titanium. The carbonaceous material may comprise a mixture of 10–90% massive ball-shaped graphite particles, 7.5–80% carbon fibers, and 2.5–30% graphite flakes by weight, and preferably comprises a mixture of approximately 80% massive ball-shaped graphite particles, 15% carbon fibers, and 5% graphite flakes by weight. The massive ball-shaped graphite particles, carbon fibers, and graphite flakes may have an average particle size of 10–35 $\mu$m. The binder may be water-based. A binder may be used that contains no fluorine. The binder may comprise carboxymethyl cellulose and may additionally comprise styrene butadiene rubber, which may comprise 0–5% of the total weight of binder plus carbonaceous material. The carboxymethyl cellulose may comprise 0–10% of the total weight of binder plus carbonaceous material.

A battery is disclosed, comprising: a case; an electrode assembly housed in the case and comprising: a negative electrode comprising: a negative substrate; and a negative coating on the negative substrate comprising: a carbonaceous material comprising a mixture of massive ball-shaped graphite particles, carbon fibers, and graphite flakes; and a first binder; a positive electrode comprising: a positive substrate; and a positive coating on the positive substrate comprising: a lithium metal oxide; and a second binder; a separator between the negative and positive electrodes; an electrolyte. The case may be hermetically sealed. The negative substrate may comprise titanium. The first binder may be water-based. A first binder may be used that contains no fluorine. The first binder may comprise carboxymethyl cellulose and may further comprise styrene butadiene rubber, and the negative substrate may comprise titanium. The negative coating may have a porosity of 20–45%. The positive coating may have a porosity of 20–40%. The negative electrode may form $C_6Li_n$, and at a maximum state of charge, n may be from 0.5 to 0.9. The positive electrode may form $Li_{1-p}MO_2$, wherein M comprises one or more transition metals, and at a maximum state of charge, p may be from 0.6 to 0.8. The electrolyte may comprise a lithium salt in a cyclic and linear solvent.

A method for making a negative electrode is disclosed, comprising the steps of: providing a substrate; combining massive ball-shaped graphite particles, carbon fibers, graphite flakes, and a binder in a solvent; mixing to form a slurry; coating at least a portion of the substrate with the slurry; and evaporating the solvent. The substrate may comprise titanium. The solvent may be water. A binder may be used that contains no fluorine. The binder may comprise carboxymethyl cellulose and may further comprise styrene butadiene.

DETAILED DESCRIPTION

Figure 1:
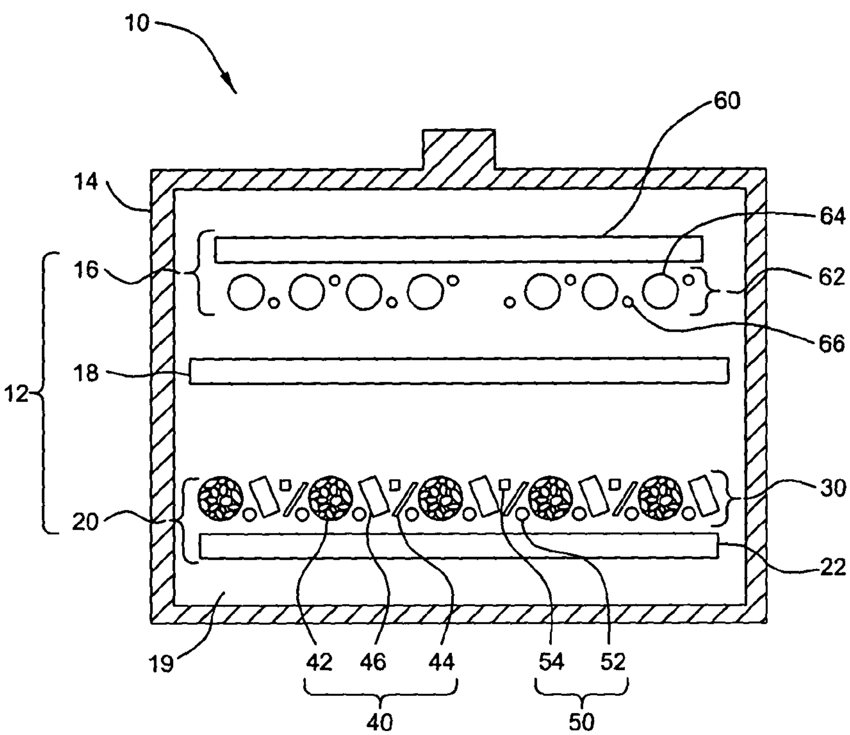
FIG. 1 is a schematic, longitudinal sectional view of a battery of the present invention.

The following text describes the preferred mode presently contemplated for carrying out the invention and is not intended to describe all possible modifications and variations consistent with the spirit and purpose of the invention. The scope of the invention should be determined with reference to the claims.

This invention provides a negative electrode that improves low temperature cycle life of a secondary battery having a nonaqueous electrolyte. The present invention also provides a secondary battery with nonaqueous electrolyte, having high voltage, and excellent cycle properties and calendar life. The invention also provides a negative electrode substrate that minimizes capacity-reducing side reactions between the substrate and electrolyte. The invention also provides a negative electrode having high conductivity to improve cycle life. The invention also provides a negative electrode having a high packing density, which improves conductivity, thereby improving cycle life, and increases energy density, thereby reducing battery volume and weight. The invention also provides a negative electrode having a binder comprising carboxy methylcellulose (CMC) and styrene butadiene rubber (SBR) to increase safety.

A negative electrode is provided having features selected to improve the low temperature cycle life of a secondary battery having a nonaqueous electrolyte. The negative electrode of the present invention preferably comprises a coating including a carbonaceous material comprising a mixture of massive ball-shaped graphite particles, carbon fibers, and graphite flakes. Preferably, the massive ball-shaped graphite particles, carbon fibers, and graphite flakes have an average particle size of 10–30 $\mu$m, and occur in a ratio of approximately 80% massive ball-shaped graphite particles: 15% carbon fiber: 5% graphite flakes. These particles may be a combination of natural and artificial graphite. This composite graphite material provides improved low temperature cycle life, high conductivity, and high stiffness, which reduces swelling.

When an unstable fluorine-containing binder such as PVdF is present in a negative electrode active layer, Li+is consumed in the reaction $F^-+Li^+\rightarrow LiF$. To avoid this, the negative electrode coating of the present invention preferably contains a binder that does not contain fluorine, and more preferably comprises carboxymethyl cellulose (CMC), which may include Na-CMC, $NH_4$-CMC, or a mixture thereof. The binder may additionally comprise styrene butadiene rubber (SBR), which imparts elasticity to the coating. The CMC preferably comprises 0–10% of the total weight of binder plus carbonaceous material, and the SBR preferably comprises 0–5% of the total weight of binder plus carbonaceous material. Alternatively, another non-fluorine-containing binder or a fluorine-containing binder that is more stable than PVdF in the battery's operating range may be used to prevent cell degradation, thus improving calendar life and safety.

In one preferred embodiment of the invention, the negative electrode comprises a titanium substrate that is coated with a slurry of carbonaceous material comprising a mixture of massive ball-shaped graphite particles, carbon fibers, and graphite flakes and a non-fluorine-containing, water-based binder comprising CMC and SBR.

In a preferred method for making a negative electrode, massive ball-shaped graphite particles, carbon fibers, and graphite flakes, a binder, and water are mixed together to form a slurry. A titanium substrate is coated with the slurry; then the water is removed by evaporation. Preferably, the binder used is CMC or CMC+SBR.

FIG. 1 is a schematic view of a battery 10 of the present invention. An electrode assembly 12 is housed in a case 14, which is preferably hermetically sealed. Hermetic sealing is advantageous because once impurities in the battery are consumed, no more impurities can enter the inside of the battery. Thus, any lithium consumption and active material degradation reactions due to impurities are ended, whereby battery capacity is stabilized and does not degrade further due to any impurities. The electrode assembly 12 comprises positive electrode 16 and negative electrode 20, separated by a separator 18, and an electrolyte 19. Positive electrode 16 comprises a positive substrate 60 having a coating 62 made of a lithium metal oxide 64 and a binder 66. The positive substrate 60 is preferably aluminum. The lithium metal oxide is preferably a lithium transition metal oxide, and more preferably $LiCo_xNi_yM_zO_2$, where M=Mn, Al, Li, Sn, In, Ga, or Ti, and $0.15\leqq x\leqq 0.5$, $0.5\leqq y\leqq 0.8$, and $0\leqq z\leqq 0.15$, and most preferably $LiCo_xNi_yAl_zO_2$ where $0.15\leqq x\leqq 0.5$, $0.5\leqq y\leqq 0.8$, and $0\leqq z\leqq 0.05$. The binder is preferably PVdF. Coating 62 preferably also contains a material for enhancing conductivity, such as acetylene black or graphite.

The separator 18 is preferably a polyolefin, such as polyethylene.

The electrolyte 19 is not particularly limited and may be an organic liquid, polymer, or inorganic. An electrolyte is chosen that allows reversible lithium intercalation. The electrolyte is preferably a lithium salt in a cyclic and linear solvent. The electrolyte is more preferably 1-M to 1.2-M $LiPF_6$ in 25–30% ethylene carbonate (EC) and 70–75% diethyl carbonate (DEC).

The negative electrode 20 of the present invention comprises negative substrate 22 coated with a slurry 30 comprising a carbonaceous mixture 40 and a binder 50. Binder 50 preferably is fluorine free and more preferably comprises CMC 52. Binder 50 may additionally contain SBR 54.

The negative electrode preferably contains active material in an amount such that its maximum n in $C_6Li_n$ is n=0.5 to 0.9, and most preferably n=0.8. Stated another way, when the battery is fully charged (preferably, to 4.1 to 4.2 V), the lithium has intercalated at the negative electrode to form $C_6Li_{0.8}$. When n is too high, electrolyte reduction occurs, and the interlayer spacing is increased and swelling and contraction of the material becomes more pronounced. These mechanisms tend to reduce battery calendar life. On the other hand, when maximum n is too low, the battery voltage and capacity are low. n=0.5 to 0.9, and most preferably n=0.8 has been found to be a good compromise between calendar life and battery voltage and capacity. The positive electrode preferably forms $Li_{1-p}MO_2$, wherein M comprises one or more transition metals, and at a maximum state of charge, p=0.6 to 0.8, and most preferably p=0.7. When the battery is fully charged, the lithium has deintercalated at the positive electrode to form, most preferably, $Li_{0.3}Co_xNi_yAl_zO_2$, where $0.15\leqq x\leqq 0.5$, $0.5\leqq y\leqq 0.8$, and $0\leqq z\leqq 0.05$. When p is too high, electrolyte oxidation occurs.

Figure 2:
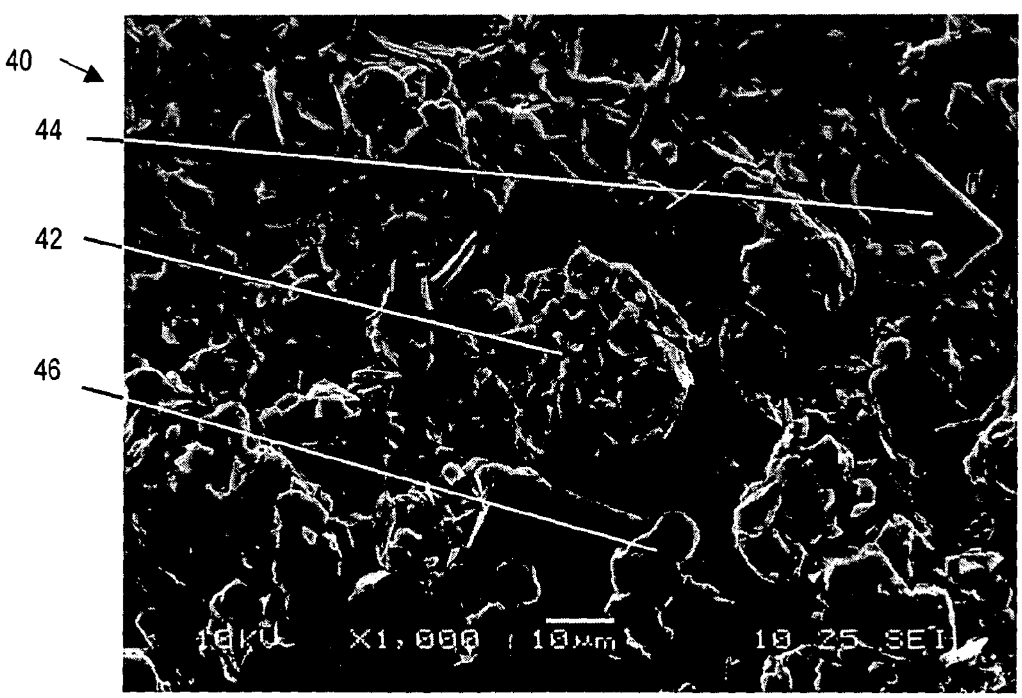
FIG. 2 is a scanning electron microscope photograph of a carbonaceous composite material of the present invention comprising spheres, fibers, and flakes.

FIG. 2 shows a scanning electron microscope photograph (×1000) of the preferred carbonaceous mixture 40 of the present invention. It preferably contains massive ball-shaped graphite particles 42, carbon fibers 44, and graphite flakes 46. Preferably, the massive ball-shaped graphite particles, carbon fibers, and graphite flakes have an average particle size of <40 $\mu$m, and occur in a ratio of approximately 80% massive ball-shaped graphite particles: 15% carbon fibers: 5% graphite flakes.

Massive ball-shaped graphite particles 42 are made up of smaller graphite particles that are synthesized together into an unorganized isotropic ball-shaped structure. Since the smaller graphite particles are unorganized, the massive graphite particles are very porous, and there are more paths through which lithium can diffuse. The ball-shaped particles are made up of high crystallinity graphite, resulting in a high capacity. The capacity of the massive ball-shaped graphite particles is 360 mAh/g, with 35 mAh/g being irreversible. Massive ball-shaped graphite particles 42 are preferably very porous with a high surface area of preferably about 3.8 $m^2/g$, as measured by BET, which allows easier lithium diffusion throughout the particles, resulting in higher rate capability and better performance at low temperatures. Massive ball-shaped graphite particles 42 preferably have a real density of preferably 2.0–2.3 g/cc, and more preferably about 2.24 g/cc, and an average particle size of preferably 10–35 $\mu$m and more preferably about 20.6 $\mu$m. Massive ball-shaped graphite particles 42 are available from Hitachi Chemical under the trade name MAG D. These particles help provide porosity to the carbonaceous mixture, which is important for allowing the electrolyte 19 to contact the surface of the carbon and to react with it.

Carbon fibers 44 preferably have a specific surface area of <5 $m^2/g$, an average particle size of preferably <40 $\mu$m and more preferably 10–35 $\mu$m, a d002 (layer distance) of <3.36 Å, and an Lc of >100 nm. Carbon fibers that are too long may cause microshorts by penetrating the separator that separates the positive and negative electrodes. The addition of the carbon fibers to the carbonaceous composition improves packing density and conductivity. Carbon fibers also may intensify the stiffness of the anode and thus prevent the anode body from swelling and decomposing. The carbon fiber used in the invention may be a vapor grown carbon fiber. The carbon fiber may be prepared by subjecting hydrocarbons such as benzene, methane, propane, and so on to vapor phase heat-decomposition under the presence of catalyst base plate made of Fe, Ni, Co, and so on in order to make carbon fibers deposit and grow on the base plate. Other examples are pitch carbon fibers, made from petroleum or coal pitch as a raw material through a spinning and carbonating treatment, and carbon fibers made from polyacrylonitrile (PAN), which may be used in the invention.

Natural or artificial graphite flakes 46 are soft and tend to reduce friction in the mixture because the planes of carbon can slip with respect to one another, allowing the graphite flakes 46 to fit within the spaces in the mixture. We prefer an average particle size of preferably <40 μm and more preferably 10–35 μm.

A mixture of carbon fiber and graphite flakes is available in the most preferred ratio of 75% carbon fiber to 25% graphite flakes under the trade name MELBLON MILLED FIBER FM70 available from Petoca Materials Ltd.

In the present invention, the mixture ratio between the massive ball-shaped graphite particles, the carbon fibers, and the graphite flakes is an important factor. The massive ball-shaped graphite particle content of the composite carbon material is preferably from 10 wt. % to 90 wt. %; the carbon fiber content of the composite carbon material is preferably from 7.5 wt. % to 80 wt. %; and the graphite flake content of the composite carbon material is preferably from 2.5 wt. % to 30 wt. %. If the massive ball-shaped graphite particle content is above 90 wt. %, the surface contact between the particles, and thus conductivity and capacity, is too low. If the fiber content is above 80 wt. %, the packing density, and thus the capacity, is decreased. If the flake content is above 30 wt. %, the surface area is too high, and therefore the amount of lithium consumed in forming the SEI layer is too great, thereby reducing capacity. Also, a flake content above 30 wt. % may lack the structural support to keep the pores open to keep the porosity within an optimal range to allow the electrolyte to react freely with the surface of the carbonaceous material. The negative coating preferably has a porosity of 20–45%, and the positive coating preferably has a porosity of 20–40%.

The binder 50 of the negative active material coating preferably contains no fluorine, and more preferably comprises CMC. Even more preferably, styrene butadiene rubber (SBR) is added, which imparts elasticity to the mixture. In contrast, prior art electrodes contained a PVdF binder, which was unstable and tended to break down, especially at higher temperatures, consuming Li+ in the reaction $F^{-}+Li^{+}\rightarrow LiF$. To avoid this, the negative electrode coating of the present invention preferably uses a CMC+SBR binder containing no fluorine. Alternatively, another non-fluorine-containing binder or a fluorine-containing binder that is more stable than PVdF in the battery's operating range may be used. Another advantage of using a binder containing SBR as compared with PVdF is that SBR binds to more area of the graphite mixture than does PVdF; therefore, the exposed surface area of graphite is minimized, minimizing electrolyte decomposition at the graphite surface. A dispersion in water of the carbonaceous mixture (described above), CMC, and SBR can be made to form a slurry that can be conveniently coated onto to a metal foil substrate.

In a preferred embodiment, the substrate is about 12 μm thick and is preferably titanium or an appropriate alloy thereof, but may alternatively comprise other substrates such as copper or stainless steel. A tape test was used to determine adhesion of a coating comprising the graphite active material of the present invention and SBR and CMC binders (96:2.5:1.5) to commercially pure titanium (CP Ti) and to copper substrates. In that test, test samples were made by coating each substrate with the graphite coating, drying it, then cutting through the coating with a knife to form a grid 10 mm×10 mm grid pattern, with lines in the grid 1 mm apart. Scotch brand tape from 3M was then applied to the coating, and then peeled away. The coating was found to adhere better to the titanium substrate than to the copper.

The preferred ratios of carbon materials in the coating are:

| | preferably | more preferably | most preferably |
|---|---|---|---|
| massive ball-shaped graphite particles | 10–90% | 10–80% | about 80% |
| carbon fibers | 7.5–80% | 15–80% | about 15% |
| graphite flakes | 2.5–30% | 2.5–30% | about 5% |
| total | | 100% | |

To this carbonaceous combination, binder materials are added in the following preferred mass per cents:

| | preferably | more preferably | most preferably |
|---|---|---|---|
| CMC | 0 to 30% | 0 to 10% | about 1.5% |
| SBR | 0 to 30% | 0 to 5% | about 2.5% |

To make a negative electrode, a mixture of shapes of carbon particles, a binder, and water are mixed together to form a slurry, which is applied to both sides of metal foil, then dried. In a preferred method, massive ball-shaped graphite particles, carbon fibers, and graphite flakes in the amounts described above are first combined. Then the binder, preferably CMC, 2% in water, is added and mixed. Following that, SBR, 40% in water, is preferably added with additional water, then mixed to form a slurry having the mass per cents of CMC and SBR as indicated above. A 12-μm titanium foil substrate is coated with the slurry, then dried by evaporating the water off using heat, then rolled.

Figure 3:
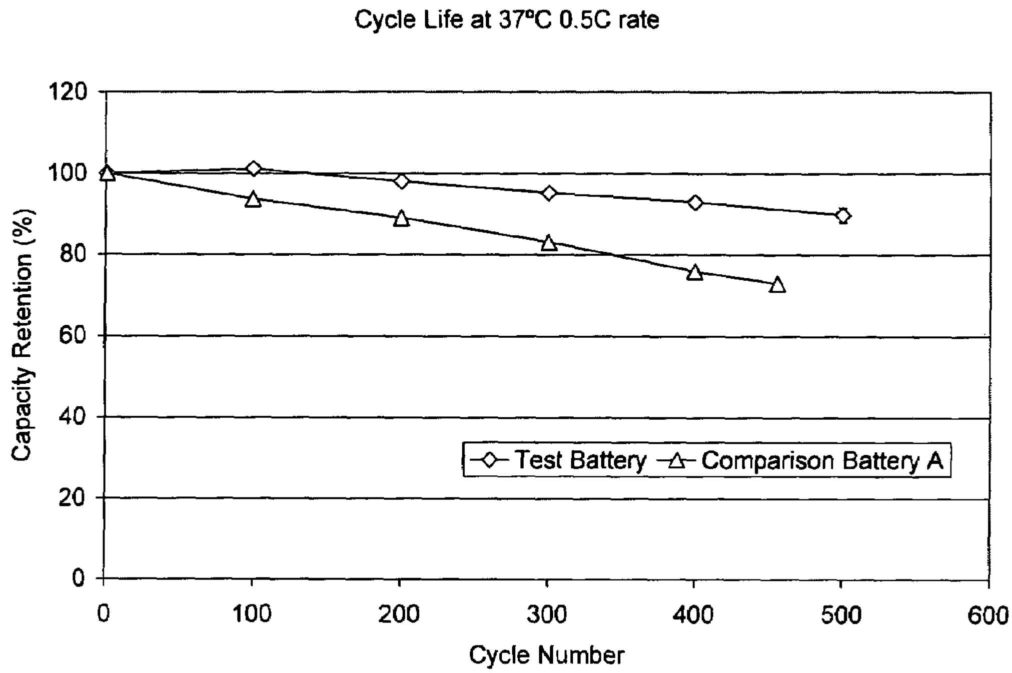
FIG. 3 is a graph showing the cycle life of the present invention at 37° C.

FIG. 3 is a graph showing the battery cycle life of the present invention at 37° C. compared with a battery using a different negative electrode. In the battery of the present invention, the electrolyte was 1.2-M $LiPF_6$ in 25% EC/75% DEC, the CMC/SBR/carbon mass ratio was 1.5:2.5:96, the ratio of the three types of carbon was 80% massive ball-shaped graphite particles: 15% carbon fibers: 5% graphite flakes, and the substrate was copper. The porosity of the negative coating was 32%. The battery used for comparison ("Comparison Battery A") had the same positive active materials, but had a negative electrode composed of a mixed graphite not having massive ball-shaped particles or carbon fibers, and having a PVdF binder. Three Test Batteries and one Comparison Battery A were cycled at a rate of 0.5 C at 37° C. and the capacity was recorded. The three Test Batteries were cycled between 2.7 V and 4.2 V, while the Comparison Battery A was cycled between 2.5 V and 4.1 V. The average capacity retention for the three batteries of each type is plotted against cycle number. The capacity retention after 500 cycles was significantly better for the average Test Battery (~90%) than for the average Comparison Battery A (~73%).

Figure 4:
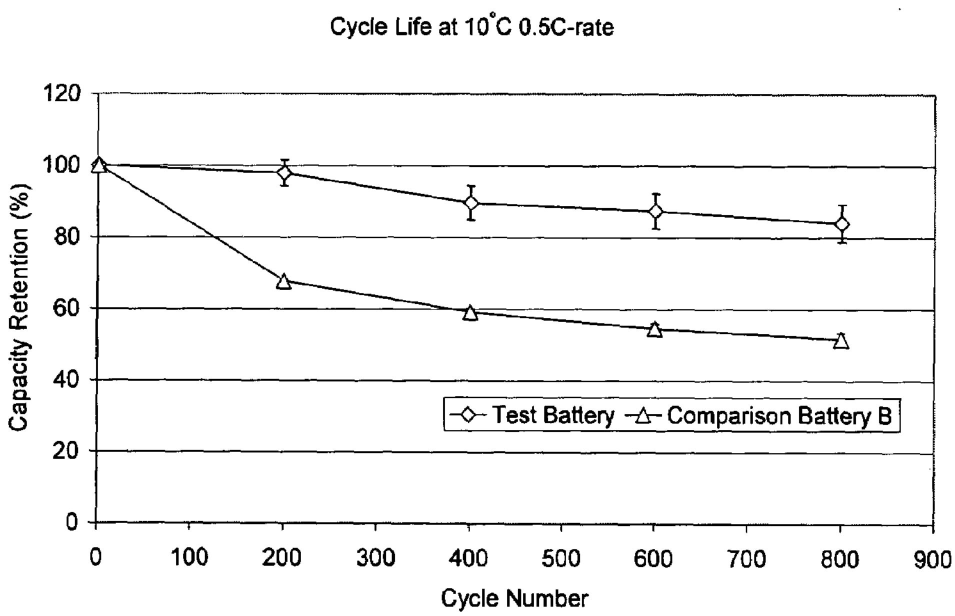
FIG. 4 is a graph showing the cycle life of the present invention at low temperature.

FIG. 4 is a graph showing the battery cycle life of the present invention at a temperature of 10° C. compared with a battery using a different mixture of carbon particles as described in U.S. patent application Ser. No. 10/264,870 filed Oct. 3, 2002, assigned to the assignee of the present invention and incorporated herein by reference. The test battery was as described above. The battery used for comparison ("Comparison Battery B") was similar to the Test Battery, except that the carbon mixture was 70% hard spheres: 22.5% carbon fibers: 7.5% graphite flakes. Three batteries of each type were cycled at a rate of 0.5 C at 10° C., and the capacity was recorded. The average capacity retention for the three batteries of each type is plotted against cycle number for every 200 cycles. The capacity retention after 800 cycles was significantly better for the average Test Battery (~84%) than for the average Comparison Battery B (~52%).

Figure 5:
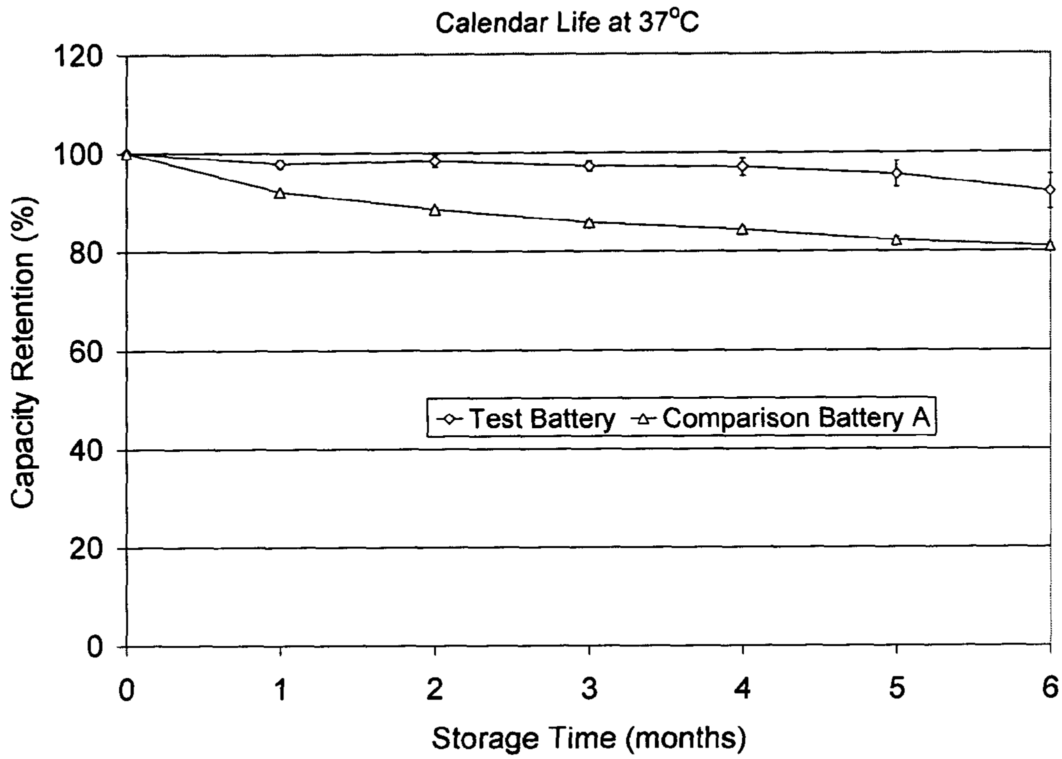
FIG. 5 is a graph showing the calendar life of the present invention at body temperature.

FIG. 5 is a graph showing the calendar life of the present invention at body temperature. The Test Battery was as described above, and the battery used for comparison was Comparison Battery A described above. The Test Batteries were charged to 4.2 V, then stored at 37° C.; the Comparison Batteries were charged to 4.1 V, and then stored at 37° C. The negative potential was approximately 0.1 V. The batteries were tested monthly for capacity retention. After 6 months, the capacity retention of the average Test Battery was significantly better (~92%) than that of the average Comparison Battery A (~81%), even though they were subjected to harsher storage conditions of 4.2 V compared to 4.1 V of the Comparison Batteries.

While the invention herein disclosed has been described by means of specific embodiments and applications thereof, numerous modifications and variations could be made thereto by those skilled in the art without departing from the scope of the invention set forth in the claims. Furthermore, various aspects of the invention may be used in other applications than those for which they were specifically described herein.

What is claimed is:

1. A negative electrode, comprising:

a substrate; and a coating on the substrate, the coating including a binder and a a carbonaceous material that includes ball-shaped graphite particles, carbon fibers, graphite flakes, wherein the ball shaped graphite particles include smaller graphite particles arranged such that the ball shaped graphite particles are isotropic.

2. The negative electrode of claim 1, wherein the carbonaceous material includes a mixture of 10–90% ball-shaped graphite particles, 7.5–80% carbon fibers, and 2.5–30% graphite flakes by weight.

3. The negative electrode of claim 1, wherein the carbonaceous material includes a mixture of 10–80% ball-shaped graphite particles, 15–80% carbon fibers, and 2.5–30% graphite flakes by weight.

4. The negative electrode of claim 1, wherein the carbonaceous material includes a mixture of approximately 80% ball-shaped graphite particles, 15% carbon fibers, and 5% graphite flakes by weight.

5. The negative electrode of claim 1, wherein the ball-shaped graphite particles have an average particle size of 10–35 $\mu$m, the carbon fibers have an average particle size of 10–35 $\mu$m, and the graphite flakes have an average particle size of 10–35 $\mu$m.

6. The negative electrode of claim 1, wherein the binder is water-based.

7. The negative electrode of claim 1, wherein the binder does not contain fluorine.

8. The negative electrode of claim 1, wherein the binder includes carboxymethyl cellulose.

9. The negative electrode of claim 8, wherein the binder includes styrene butadiene rubber.

10. The negative electrode of claim 9, wherein the styrene butadiene includes 0–5% of the total weight of binder plus carbonaceous material.

11. The negative electrode of claim 9, wherein the substrate includes titanium.

12. The negative electrode of claim 8, wherein the carboxymethyl cellulose includes 0–10% of the total weight of binder plus carbonaceous material.

13. The negative electrode of claim 1, wherein the substrate includes titanium.

14. The electrode of claim 1, wherein the smaller graphite particles are unorganized in the ball shaped graphite particles.

15. A battery, comprising:

a case;

a negative electrode housed in the case, the negative electrode having a negative coating on a negative substrate, the negative coating having a first binder and a carbonaceous material that includes ball-shaped graphite particles, carbon fibers, and graphite flakes, wherein the ball shaped graphite particles include smaller graphite particles arranged such that the ball shaped graphite particles are isotropic.

16. The battery of claim 15, wherein the carbonaceous material includes 10–90% ball-shaped graphite particles, 7.5–80% carbon fibers, and 2.5–30% graphite flakes by weight.

17. The battery of claim 15, wherein the carbonaceous material includes 10–80% ball-shaped graphite particles, 15–80% carbon fibers, and 2.5–30% graphite flakes by weight.

18. The battery of claim 15, wherein the carbonaceous material includes approximately 80% ball-shaped graphite particles, 15% carbon fibers, and 5% graphite flakes by weight.

19. The battery as in claim 15, wherein the case is hermetically sealed.

20. The battery as in claim 15, wherein the first binder is water-based.

21. The battery as in claim 15, wherein the first binder contains no fluorine.

22. The battery as in claim 15, wherein the first binder includes carboxymethyl cellulose.

23. The battery as in claim 22, wherein the first binder further includes styrene butadiene rubber.

24. The battery as in claim 23, wherein the negative substrate includes titanium.

25. The battery as in claim 14, wherein the negative coating has a porosity of 20–45%.

26. The battery as in claim 15, further comprising:

a positive electrode housed in the case, the positive electrode having a positive coating on a positive substrate, wherein the positive coating has a porosity of 20–40%.

27. The battery as in claim 15, wherein the negative electrode forms $C_6Li_n$, and at a maximum state of charge, $0.5 \leqq n \leqq 0.9$.

28. The battery as in claim 15, further comprising:

a positive electrode housed in the case, wherein the positive electrode is constructed so as to form $Li_{1-p}MO_2$ during operation of the battery, wherein M includes one or more transition metals, and at a maximum state of charge, $0.6 \leqq p \leqq 0.8$.

29. The battery as in claim 15, wherein the negative substrate includes titanium.

30. The battery as in claim 29, further comprising:

an electrolyte in the case and activating the negative electrode and a positive electrode, wherein the electrolyte includes a lithium salt in a cyclic and linear solvent.

31. The battery of claim 15, wherein the smaller graphite particles are unorganized in the ball shaped graphite particles.

32. A method for making a negative electrode includes the steps of:

providing a substrate;

combining components that include ball-shaped graphite particles, carbon fibers, graphite flakes, and a binder in a solvent, wherein the ball shaped graphite particles include smaller graphite particles arranged such that the ball shaped graphite particles are isotropic;

mixing the components to form a slurry;

coating at least a portion of the substrate with the slurry; and evaporating the solvent.

33. The method of claim 32, wherein the substrate includes titanium.

34. The method of claim 32, wherein the solvent is water.

35. The method of claim 32, wherein the binder contains no fluorine.

36. The method of claim 32, wherein the binder includes carboxymethyl cellulose.

37. The method of claim 36, wherein the binder further includes styrene butadiene.

38. The method of claim 37, wherein the substrate includes titanium.

* * * * *